United States Patent
Schweitzer

(10) Patent No.: US 6,477,070 B2
(45) Date of Patent: Nov. 5, 2002

(54) CURRENT-REGULATOR CIRCUIT OF AN ELECTROMAGNETIC FLOWMETER

(75) Inventor: Joel Schweitzer, Issenheim (FR)

(73) Assignee: Endress + Hauser Flowtec AG, Reinach (CH)

(*) Notice: Subject to any disclaimer, the term of this patent is extended or adjusted under 35 U.S.C. 154(b) by 0 days.

(21) Appl. No.: 09/860,767

(22) Filed: May 21, 2001

(65) Prior Publication Data
US 2002/0000798 A1 Jan. 3, 2002

(30) Foreign Application Priority Data

May 22, 2000 (EP) .............................. 00110817

(51) Int. Cl.[7] .............................. H01M 3/24; G01F 1/60
(52) U.S. Cl. ...................... 363/98; 363/131; 73/861.12; 361/152
(58) Field of Search ........................... 323/312; 363/98, 363/97, 131, 132, 17, 58; 361/152, 151; 73/861.12, 861.77

(56) References Cited

U.S. PATENT DOCUMENTS

| 3,736,473 A | * | 5/1973 | Pugh ........................ 361/152 |
| 4,410,926 A | | 10/1983 | Hafner et al. |
| 4,563,904 A | * | 1/1986 | Geisler et al. ........... 73/861.12 |
| 4,663,976 A | * | 5/1987 | Suzuki et al. ............ 73/861.12 |
| 4,887,469 A | * | 12/1989 | Shoptaw .................. 73/861.77 |
| 5,390,070 A | * | 2/1995 | Niedermeier ............... 361/152 |
| 5,530,639 A | * | 6/1996 | Schulz et al. ................. 363/17 |
| 5,763,963 A | * | 6/1998 | Zydek et al. ............... 307/130 |
| 6,031,740 A | | 2/2000 | Budmiger ..................... 363/58 |

FOREIGN PATENT DOCUMENTS

DE  3334152 A1  4/1985

* cited by examiner

Primary Examiner—Rajnikant B. Patel
(74) Attorney, Agent, or Firm—Jones, Tullar & Cooper, P.C.

(57) ABSTRACT

The current-regulator circuit generates a supply current by means of clocked setting electronics and by means of control electronics which deliver a pulse-width-modulated clock signal. The setting electronics comprise a storage choke and a smoothing capacitor coupled thereto. By means of two electronic switches of the setting electronics, a first potential and a second potential are applied alternately to the storage choke, so that a current flowing through the storage choke has an AC component flowing through the smoothing capacitor and a DC component flowing through the excitation circuit, the DC component serving as supply current. The current-regulator circuit proposed is particularly suitable for use in an intrinsically safe and/or field-bus-enabled electromagnetic flowmeter.

5 Claims, 2 Drawing Sheets

CURRENT-REGULATOR CIRCUIT OF AN ELECTROMAGNETIC FLOWMETER

FIELD OF THE INVENTION

This invention relates to a current-regulator circuit of an electromagnetic flowmeter for generating a supply current for an excitation circuit.

BACKGROUND OF THE INVENTION

Such flowmeters, as is well known, serve to measure the volumetric flow rate of an electrically conductive fluid flowing through a flow-sensing tube of an electromagnetic flow sensor. By means of a magnetic system connected to an excitation circuit, a magnetic field is produced which cuts the fluid within a measured volume in sections, particularly in the region of high fluid velocity, perpendicular to the direction of fluid flow and which closes essentially outside the fluid. To guide and effectively couple the magnetic field into the measured volume, the magnetic system commonly comprises two coil cores that are positioned at a given distance from each other, particularly at diametrically-opposed positions, along a circumference of the flow-sensing tube and whose respective free end faces are disposed opposite each other, particularly mirror-symmetrically. By means of at least one excitation coil of the excitation circuit, the magnetic field is coupled into the coil cores in such a way as to cut the fluid flowing between the two end faces, at least in sections, perpendicular to the direction of flow.

Because of the motion of the free charge carriers of the fluid in the magnetic field, according to the magnetohydrodynamic principle, an electric field of flow-rate-dependent strength is produced in the measured volume which is perpendicular to the magnetic field and perpendicular to the direction of fluid flow. By means of two measuring electrodes positioned at a distance from each other in the direction of the electric field and by means of an evaluating circuit connected to them, a voltage induced in the fluid can be measured. To pick off the induced voltage, either galvanic electrodes, which are in contact with the fluid, or capacitive electrodes, which do not contact the fluid, are used.

The evaluating circuit derives from this voltage both a measurement signal representative of an instantaneous volumetric flow rate and a measurement signal representative of a volumetric flow rate integrated over time, i.e., a totalized volumetric flow rate. These measurement signals are preferably transferred in the form of digital data to higher-level, process-monitoring and/or process-controlling information systems. To that end, the flowmeter is connected to a suitable data transmission system.

During operation of the flowmeter, the excitation circuit is commonly supplied with a regulated direct current and/or a clocked direct current. To produce the magnetic field, this direct current is converted in the excitation circuit to an excitation current flowing intermittently or alternatingly through the excitation coil. Such intermittent or alternating excitation currents can be set, for example, by means of an H or T network which is connected to the excitation coil and cyclically reverses the polarity of the impressed direct current, cf., for instance, U.S. Pat. Nos. 4,410,926 or 6,031,740.

U.S. Pat. No. 4,410,926 discloses a current-regulator circuit of an electromagnetic flowmeter which serves to produce a supply current for an excitation circuit comprising at least one excitation coil which in operation is traversed by the excitation current, the current-regulator circuit comprising:

control electronics
to which an excitation current signal representative of the excitation current and a reference current signal representative of a reference value for the excitation current are applied at the input end, and
which provides at the output end a pulse-width-modulated first clock signal and a second clock signal; and
setting electronics
with a smoothing capacitor and
with a switch,
the setting electronics being supplied with an alternating voltage and being controlled by a first and a second clock signal, and
the setting electronics setting the supply current by means of the switch, and
the smoothing capacitor being temporarily traversed by the supply current.

It turned out, however, that if switching regulators for setting the direct current in conventional electromagnetic flowmeters are used in an electromagnetic flowmeter electrically powered via a two-wire current loop, their efficiency is too low. By means of such two-wire current loops, such as the standard interface RS-485 or a 4- to 20-mA current loop, for example, field devices, particularly intrinsically safe devices, are preferably coupled to the aforementioned data transmission system and/or supplied with operating power. For the data transmission systems, field bus systems, particularly serial systems, such as Profibus-PA, Foundation Field Bus, CANbus, etc., and the corresponding communications protocols may be used.

SUMMARY OF THE INVENTION

It is therefore an object of the invention to provide a current-regulator circuit which is suitable for use in an electromagnetic flowmeter and particularly in an intrisically safe and/or field-bus-enabled flowmeter.

To attain this object, the invention provides a current-regulator circuit of an electromagnetic flowmeter for generating a supply current for an excitation circuit comprising at least one excitation coil which in operation is traversed by an excitation current, the current-regulator circuit comprising:

control electronics
to the input end of which an excitation current signal representative of the excitation current and a reference current signal representative of a reference value for the excitation current are applied, and
which provides at the output end a pulse-width-modulated first clock signal; and
setting electronics with
a storage choke,
a smoothing capacitor,
a first switch, and
a second switch,
the setting electronics being powered from a two-wire interface and controlled by the first clock signal, and
the setting electronics setting a choke current flowing through the storage choke by means of the first switch and the second switch in such a way that
the smoothing capacitor is traversed by an alternating-current component of the choke current, and
the excitation circuit is traversed by a direct-current component of the choke current representing the supply current.

In a first preferred embodiment of the invention, the second switch is bypassed with a diode which is traversed by the choke current when the switches are simultaneously open.

In a second preferred embodiment of the invention, the first clock signal serves to control the first switch, and the setting electronics comprise a logic circuit which generates by means of the first clock signal a second clock signal for controlling the second switch.

One advantage of the invention consists in a high efficiency of the setting electronics, particularly during the discharge of the smoothing capacitor. Another advantage of the invention is the wide dynamic range of the setting electronics during the setting of the supply current.

BRIEF DESCRIPTION OF THE DRAWINGS

The invention will become more apparent from the following description of an embodiment taken in conjunction with the accompanying drawings, in which.

DETAILED DESCRIPTION OF EXEMPLARY EMBODIMENTS

Figures 1, 2:
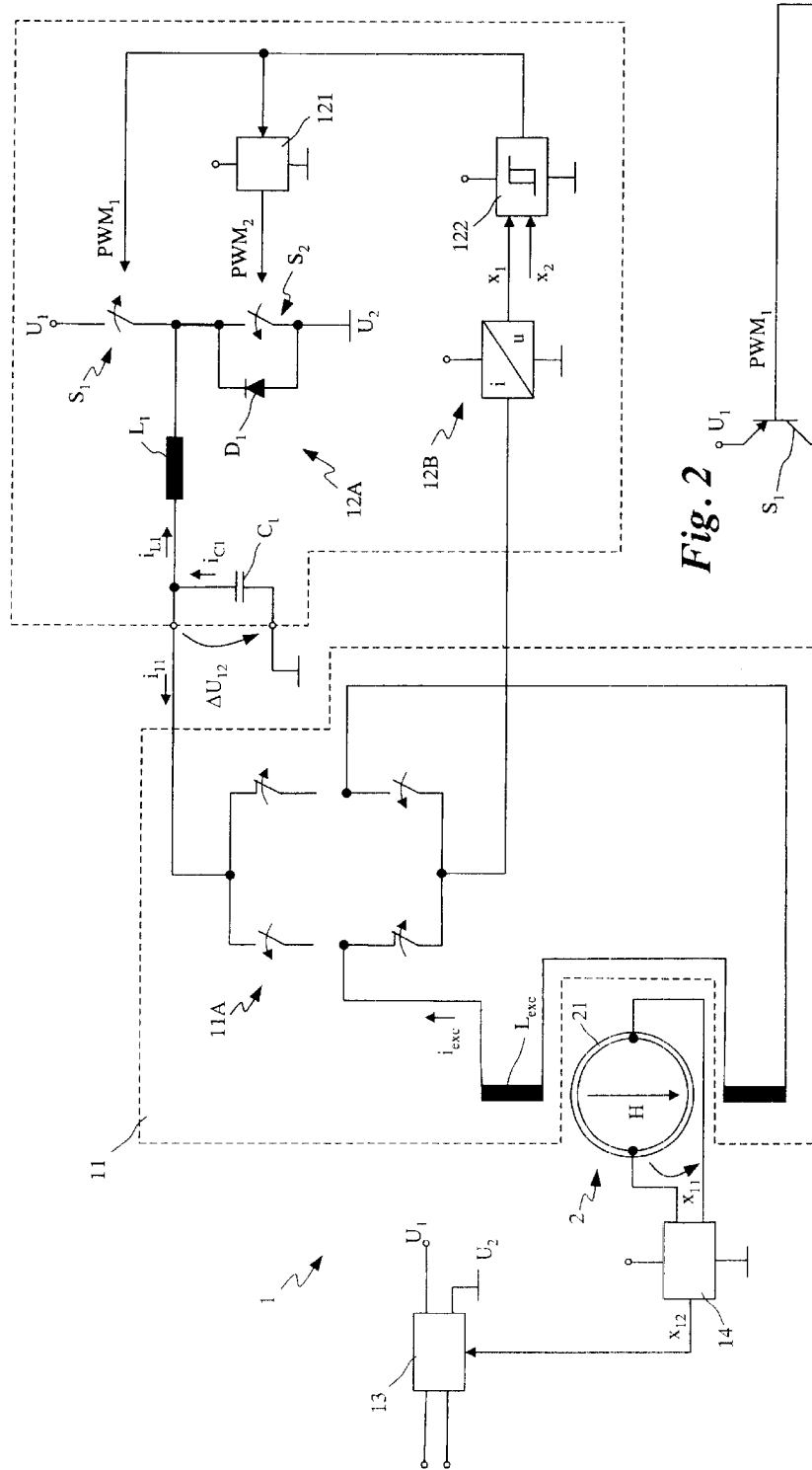
FIG. 1 shows a current-regulator circuit of an electromagnetic flowmeter.
FIG. 2 shows a development of the current-regulator circuit of FIG. 1.

While the invention is susceptible to various modifications and alternative forms, exemplary embodiments thereof have been shown by way of example in the drawings and will herein be described in detail. It should be understood, however, that there is no intent to limit the invention to the particular forms diclosed, but on the contrary, the intention is to cover all modifications, equivalents, and alternatives falling within the spirit and scope of the invention as defined by the claims.

FIG. 1 schematically shows a flowmeter with meter electronics 1 and with an electromagnetic flow sensor 2. The flowmeter serves to sense a volumetric flow rate of a fluid flowing in a pipe by means of flow sensor 2 and to convert a sensor signal $x_{11}$, produced by flow sensor 2, to a measurement signal $x_{12}$ representing the volumetric flow rate by means of meter electronics 1. In operation, the flowmeter is electrically powered from an externally fed two-wire current loop.

To connect the flowmeter to the two-wire current loop, meter electronics 1 comprise a suitable two-wire interface 13. The two-wire interface 13 may be a standard interface RS-485 or a 4- to 20-mA current loop, for example. If a 4- to 20-mA current loop is used, the flowmeter will be operated on a voltage of 12 V, for example, which drives a fundamental current component of approximately 4 mA that serves to supply the flowmeter. Thus, in that case, the flowmeter is supplied with electric power of 48 mW. If configured as a 4- to 20-mA current loop, two-wire interface 13 also serves to convert the measurement signal $x_{12}$ into a corresponding signal current in the range of 4 to 20 mA, which is injected into the two-wire current loop.

To transmit the measurement signal $x_{12}$ to a higher-level information system (not shown), such as a stored-program control system and/or a process control system, the flowmeter is coupled via two-wire interface 13 to a field bus (not shown), particularly a serial bus, such as Profibus-PA, Foundation Field Bus, CANbus, etc. The coupling to the field bus may be either direct, for instance if the standard interface RS-485 is used, or via a remote I/O module. To transmit measurement data from and/or setting data to the flowmeter, smart protocols familiar to those skilled in the art, such as HART, INTENSOR, etc., may be used.

As shown in FIG. 1, flow sensor 2 comprises a flow tube 21, through which an electrically conductive fluid flows during operation of the flowmeter. Flow tube 21 is commonly made of nonferromagnetic and, at least on the fluid-contacting inside, electrically insulating material.

To measure volumetric flow rate, a magnetic field H of adjustable strength is set up in the lumen of flow tube 21 by means of a magnetic system disposed on the flow tube and preferably consisting of ferromagnetic steel sheets, such that the magnetic field H cuts the moving liquid in sections, particularly perpendicular to the direction of flow.

Because of the motion of the free charge carriers of the fluid through the magnetic field H, according to the magnetohydrodynamic principle, an electric field is produced in the measured volume which is perpendicular to the magnetic field H and perpendicular to the direction of fluid flow. Thus, the measurement voltage induced in the fluid and serving as the sensor signal $x_{11}$ representing the volumetric flow rate of the fluid can be detected by means of two electrodes positioned at a given distance from each other in the direction of the electric field.

The construction and use of such electromagnetic flow sensors 2 are described in U.S. Pat. No. 5,540,103, for example.

The magnetic field H is produced by means of an excitation circuit 11 of meter electronics 1, which comprises at least one excitation coil $L_{exc}$, which in operation is traversed by an excitation current. To suppress electrochemical interference voltages, the excitation current $i_{exc}$ is commonly fed into excitation coil $L_{exc}$ alternatingly by means of a modulation circuit, for instance by means of an H network, so that the magnetic field H is an alternating field, cf., for example, U.S. Pat. No. 4,410,926.

To set the excitation current $i_{exc}$, excitation circuit 11 is supplied with a regulated supply current $i_{11}$. The supply current may be either a constant or a varying direct current, cf. U.S. Pat. No. 6,031,740. In the embodiment shown in FIG. 1, the supply current $i_{11}$ preferably has a strength of approximately 10 to 20 mA.

If necessary, the strength of the supply current $i_{11}$ may, of course, be set at a different value.

As shown in FIG. 1, the supply current $i_{11}$ is provided by a current-regulator circuit comprising control electronics 12B and setting electronics 12A with a storage choke $L_1$ and a smoothing capacitor $C_1$.

Setting electronics 12A have a first voltage terminal connected to a first potential $U_1$ of, e.g., 4 volts, which is a DC voltage delivered by two-wire interface 13, and a second voltage terminal connected to a second potential $U_2$ of this DC voltage, for instance a ground potential of 0 volt.

Setting electronics 12A further comprise a first electronic switch $S_1$ and a second electronic switch $S_2$, which two switches serve to switch the potential $U_1$ or the potential $U_2$ through to a first terminal of storage choke $L_1$.

Particularly advantageously, switch $S_i$, as shown schematically in FIG. 2, is implemented with a switching transistor of the pnp type. Then, a short-circuit current flowing in the current-regulator circuit when switches $S_1$ and $S_2$ are simultaneously closed will be limited to, e.g., 10 mA. Switch $S_2$ may, for instance, be a single field-effect transistor or two parallel-connected and identically clocked field-effect transistors, the field-effect transistors being preferably of the n-channel enhancement type.

A second terminal of storage choke $L_1$ is connected to smoothing capacitor $C_1$, as shown in FIG. 2. Thus, a terminal voltage appearing between the second terminal of storage choke $L_1$ and the potential $U_2$ corresponds to a supply voltage $\Delta U_{12}$ driving the supply current $i_{11}$ for the excitation circuit 11.

If only the first voltage terminal of setting electronics 12A is connected through, so that the first terminal of storage choke $L_1$ is virtually also at potential $U_1$, a choke current $i_{L1}$ flowing through storage choke $L_1$ will have a charging-current component that also flows through smoothing capacitor $C_1$ until the latter has become charged, so that the second terminal of storage choke $L_1$ is also at potential $U_1$. Furthermore, if only the second voltage terminal of setting electronics 12A is connected through, so that the first choke terminal is approximately at potential $U_2$, smoothing capacitor $C_1$ will be discharged by a discharge-current component of choke current $i_{L1}$ until the second choke terminal is also at potential $U_2$.

To set the supply current $i_{11}$, the two switches $S_1$, $S_2$ are controlled in such a way that they are on only one at a time, i.e., that they are traversed by the choke current $i_{L1}$ only one at a time. To accomplish this, a pulse-width-modulated first clock signal $PWM_1$, particularly a binary clock signal, is applied to setting electronics 12A via a control-signal input. In the embodiment shown in FIG. 2, the control-signal input is implemented with a control electrode of switch $S_1$ and with a first input of a logic circuit 121 of setting electronics 12A. At its output end, logic circuit 121 is connected to a control electrode of switch $S_2$.

Logic circuit 121 serves to apply to the control electrode of switch $S_2$ a binary second clock signal $PWM_2$, which is at a level that closes switch $S_2$ only when the clock signal $PWM_1$ is at a level that opens switch $S_1$. Logic circuit 121 may be implemented with a single inverter, particularly with an inverting Schmitt trigger, for example.

Figure 3:
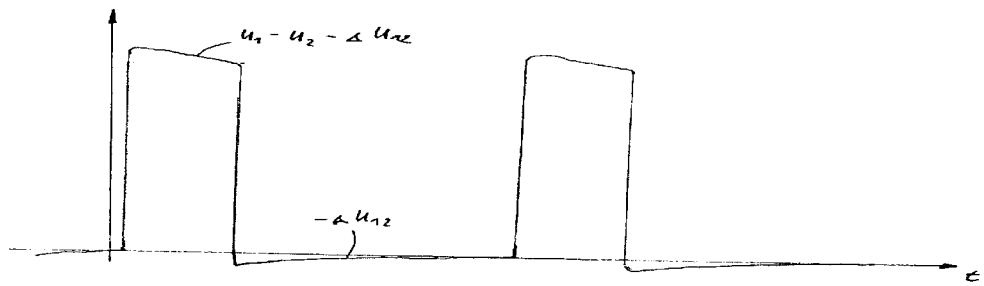
FIGS. 3 to 7 show current or voltage waveforms of the current-regulator circuit of FIG. 1.
Figure 4:
Figure 5:
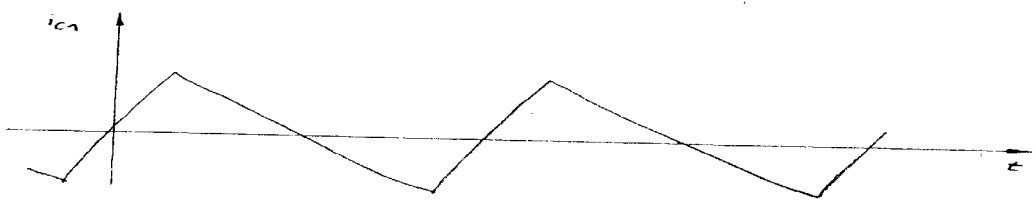
Figure 6:
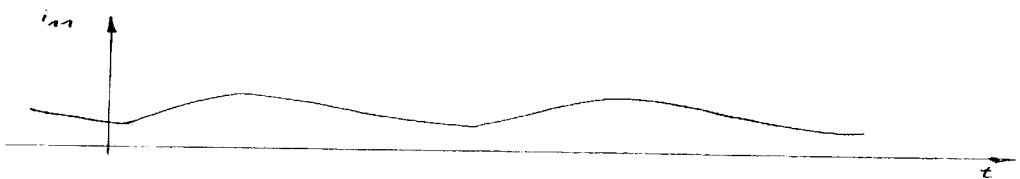
Figure 7:
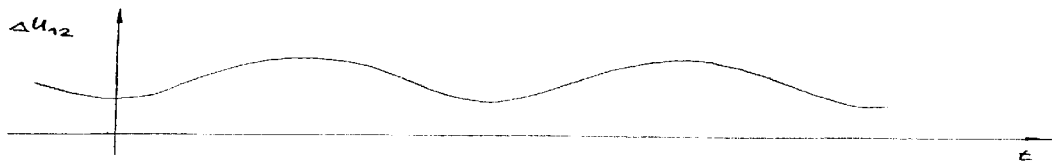

With such an alternating through-connection of the two voltage terminals of setting electronics 12A, the choke current $i_{L1}$, as shown schematically in FIG. 4, is a unipolar alternating current which is driven alternately by a first potential difference $U_1-U_2-\Delta U_{12}$ and a second potential difference $-\Delta U_{12}$, see FIG. 3. The choke current $i_{L1}$ has an AC component $i_{C1}$, which alternately charges and discharges the smoothing capacitor $C_1$ as shown in FIG. 5, and a current component flowing as a direct current $i_{11}$ through excitation circuit 11, cf. FIG. 6. The supply voltage $\Delta U_{12}$ has the waveform of a pulsating voltage shown in FIG. 7.

Advantageously, the clock signals $PWM_1$, $PWM_2$ are shaped so that an edge of one clock signal $PWM_1$ or $PWM_2$ which opens switch $S_1$ or switch $S_2$, respectively, is always followed with a slight time difference of, e.g., 300 ns by a complementary edge of the other clock signal $PWM_1$ or $PWM_2$ which closes the respective other switch $S_1$ or $S_2$. Thus, both switches $S_1$, $S_2$ are open for a short time of, e.g., 300 ns, whereby the possibility of a short circuit of the two potentials $U_1$, $U_2$, in particular, can be virtually excluded. To the person skilled in the art it is clear that depending on the logic used for the switches $S_1$, $S_2$, the switch-closing signal edges may, for instance, be positive or negative edges; the same applies analogously to the switch-closing signal edges.

Preferably, logic circuit 121 is implemented in such a way that the clock signal $PWM_2$ is at a level closing the switch $S_2$ only when the clock signal $PWM_1$ is at a level opening the switch $S_1$ and when the first choke terminal is approximately at potential $U_2$.

In a preferred embodiment of the invention, logic circuit 121, as shown in FIG. 2 for the case of a switch $S_1$ implemented as a normally closed contact using a pnp transistor, comprises an AND gate with a first input for the clock signal $PWM_1$. It further comprises an inverter, particularly an inverting Schmitt trigger, whose input is connected to the first choke terminal and whose output is coupled to a second input of the AND gate. Through such a configuration of the logic circuit 121 producing the clock signal $PWM_2$, an interlock of switches $S_1$, $S_2$ is provided in an advantageous manner, with switch $S_2$ remaining open when switch $S_1$ is faulty and particularly punctured.

As shown in FIG. 1, the clock signal $PWM_1$ is produced by control electronics 12B. To that end, an excitation current signal $x_1$, representing the instantaneous excitation current $i_{exc}$, and a reference current signal $x_2$, representing a reference value for the excitation current $i_{exc}$, are compared in a comparator 121 of control electronics 12B. As shown in FIG. 1, the excitation current signal $x_1$ may be generated by means of a current-to-voltage-converting amplifier circuit of control electronics 12B which takes off a voltage proportional to the excitation current $i_{WXC}$ across a sensing resistor connected in series with excitation coil $L_{exc}$. For the reference current signal $x_2$, a fixed or adjustable signal voltage may be used.

A binary, pulse-width-modulated comparator signal provided at the output of comparator 122 may serve as the clock signal $PWM_1$ for setting electronics 12A, as shown in FIG. 2. In the embodiment of FIG. 1, the comparator delivers the clock signal $PWM_1$ with a logic level closing the switch $S_1$, for instance with a logic 1, when the excitation current $i_{exc}$ is greater than the reference value; otherwise the clock signal $PWM_1$ is at a level opening the switch $S_1$, for instance at logic 0.

In a further preferred embodiment of the invention, switch $S_2$ is bypassed with a diode $D_1$ such that the anode of the latter is virtually at potential $U_2$ and the cathode is at an instantaneous potential of the first choke terminal. Diode $D_1$ acts as a freewheeling diode which carries the choke current $i_{L1}$ in the case indicated in FIG. 1, namely if the two switches $S_1$, $S_2$ are simultaneously open. This ensures that the supply voltage $\Delta U_{12}$ does not assume inadmissibly high peak values when switch $S_1$ or $S_2$ is opened, particularly if both switches $S_1$, $S_2$ are simultaneously open.

One advantage of the current-regulator circuit according to the invention is that its efficiency, namely the ratio of the power fed into excitation circuit 11, particularly into excitation coil $L_{exc}$, to the input power of the current-regulator circuit reaches approximately 90% over an entire clock period, and particularly also during intervals between pulses; i.e., this efficiency is nearly independent of the mark-to-space ratio of the clock signal $PWM_1$.

Because of its high efficiency, the current-regulator circuit according to the invention is particularly suited for use in an electromagnetic flowmeter, especially in an intrinsically safe flowmeter, which is supplied with electric power of, e.g., 48 mW via a two-wire interface, for instance a 4- to 20-mA current loop.

While the invention has been illustrated and described in detail in the drawings and forgoing description, such illustration and description is to be considered as exemplary not restrictive in character, it being understood that only exemplary embodiments have been shown and described and that all changes and modifications that come within the spirit and scope of the invention as described herein are desired to be included.

What is claimed is:

1. A current-regulator circuit of an electromagnetic flowmeter for generating a supply current for an excitation circuit having at least one excitation coil which in operation is traversed by an excitation current, said current-regulator circuit comprising:

control electronics, to the input end of which an excitation current signal representative of the excitation current and a reference current signal representative of a reference value for the excitation current are applied, and which provides at the output end a pulse-width modulated first clock signal; and a setting electronics, including a storage choke, a smoothing capacitor, a first switch, and a second switch, wherein:

said setting electronics being powered by a D.C. voltage and being controlled by the first clock signal, and said setting electronics setting a choke current flowing through the storage choke by means of the first switch and the second switch in such a way that the smoothing capacitor is traversed by an alternating-current component of the choke current, and the excitation circuit is traversed by a direct-current component of the choke current representing the supply current.

2. A current-regulator circuit as claimed in claim 1, wherein the second switch is bypassed with a diode which is traversed by the choke current when the switches are simultaneously open.

3. A current-regulator circuit as claimed in claim 1, wherein the first clock signal serves to control the first switch, and wherein the setting electronics comprise a logic circuit which generates by means of the first clock signal a second clock signal for controlling the second switch.

4. Electromagnetic flowmeter with a current-regulator circuit, current-regulator comprising: at least one excitation coil which in operation is traversed by an excitation current, said current-regulator circuit comprising:

control electronics, to the input end of which an excitation current signal representative of the excitation current and a reference current signal representative of a reference value for the excitation current are applied, and which provides at the output end a pulse-width modulated first clock signal; and a setting electronics, including a storage choke, a smoothing capacitor, a first switch, and a second switch, wherein:

said setting electronics being powered by a D.C. voltage and being controlled by the first clock signal, and said setting electronics setting a choke current flowing through the storage choke by means of the first switch and the second switch in such a way that the smoothing capacitor is traversed by an alternating-current component of the choke current, and the excitation circuit is traversed by a direct-current component of the choke current representing the supply current.

5. Electromagnetic flowmeter with a current-regulator circuit, current-regulator circuit comprising: at least one excitation coil which in operation is traversed by an excitation current, said current-regulator circuit comprising:

control electronics, to the input end of which an excitation current signal representative of the excitation current and a reference current signal representative of a reference value for the excitation current are applied, and which provides at the output end a pulse-width modulated first clock signal; and a setting electronics, including a storage choke, a smoothing capacitor, a first switch, and a second switch, wherein:

said setting electronics being powered by a D.C. voltage and being controlled by the first clock signal, and said setting electronics setting a choke current flowing through the storage choke by means of the first switch and the second switch in such a way that the smoothing capacitor is traversed by an alternating-current component of the choke current, and the excitation circuit is traversed by a direct-current component of the choke current representing the supply current;

said second switch is bypassed with a diode which is traversed by the choke current when the switches are simultaneously open; and said first clock signal serves to control the first switch, and wherein the setting electronics comprise a logic circuit which generates by means of the first clock signal a second clock signal for controlling the second switch.

* * * * *